(12) United States Patent
Johan et al.

(10) Patent No.: US 10,515,538 B2
(45) Date of Patent: Dec. 24, 2019

(54) COMMUNICATION SYSTEMS

(71) Applicant: Carrier Corporation, Farmington, CT (US)

(72) Inventors: Ron Johan, Queens Park (AU); Gabriel Daher, Long Point (AU); Daniel Ming On Wu, Chatswood (AU)

(73) Assignee: CARRIER CORPORATION, Palm Beach Gardens, FL (US)

( * ) Notice: Subject to any disclaimer, the term of this patent is extended or adjusted under 35 U.S.C. 154(b) by 128 days.

(21) Appl. No.: 15/528,699

(22) PCT Filed: Nov. 18, 2015

(86) PCT No.: PCT/US2015/061249
§ 371 (c)(1),
(2) Date: May 22, 2017

(87) PCT Pub. No.: WO2016/085727
PCT Pub. Date: Jun. 2, 2016

(65) Prior Publication Data
US 2017/0256157 A1 Sep. 7, 2017

Related U.S. Application Data

(60) Provisional application No. 62/083,538, filed on Nov. 24, 2014.

(51) Int. Cl.
*H04L 12/801* (2013.01)
*H04L 12/24* (2006.01)
(Continued)

(52) U.S. Cl.
CPC .......... *G08B 25/08* (2013.01); *H04L 12/2834* (2013.01); *H04L 12/2858* (2013.01);
(Continued)

(58) Field of Classification Search
CPC . G08B 25/08; H04L 12/4633; H04L 12/2834; H04L 45/74; H04L 45/22
See application file for complete search history.

(56) References Cited

U.S. PATENT DOCUMENTS 6,889,321 B1 * 5/2005 Kung ................ H04L 29/06027
348/E7.056
7,167,443 B1 * 1/2007 Dantu ................... H04L 12/437
370/218

(Continued)

OTHER PUBLICATIONS

International Search Report for application PCT/US2015/061249, dated May 10, 2016, 17pgs.
(Continued)

*Primary Examiner* — Brian S Roberts
*Assistant Examiner* — Abusayeed M Haque
(74) *Attorney, Agent, or Firm* — Cantor Colburn LLP

(57) ABSTRACT

A message communication system, such as a security system, having a distributed architecture includes a plurality of customer terminals, one or more proprietary routers, one or more automation systems, each customer terminal being associated with an associated at least one of the automation systems, wherein each customer terminal includes at least one communication address of at least one of the proprietary routers, the proprietary router including a routing table to forward the message to the associated automation system or a central station gateway linked to the automation system.

22 Claims, 11 Drawing Sheets

(51) Int. Cl.
*H04L 5/14* (2006.01)
*H04L 12/751* (2013.01)
*G08B 25/08* (2006.01)
*H04L 12/28* (2006.01)
*H04L 12/741* (2013.01)
*H04L 12/46* (2006.01)
*H04L 12/707* (2013.01)

(52) U.S. Cl.
CPC .......... H04L 12/4633 (2013.01); H04L 45/74 (2013.01); *H04L 45/22* (2013.01)

(56) References Cited

U.S. PATENT DOCUMENTS

| | | | | |
|---|---|---|---|---|
| 7,197,558 | B1* | 3/2007 | Harper | H04L 41/069 |
| | | | | 707/999.003 |
| 7,253,728 | B2 | 8/2007 | Johan et al. | |
| 8,335,842 | B2 | 12/2012 | Raji et al. | |
| 9,049,183 | B2* | 6/2015 | Zhao | H04L 69/08 |
| 2003/0045287 | A1* | 3/2003 | Taniguchi | H04L 29/12311 |
| | | | | 455/433 |
| 2008/0175176 | A1* | 7/2008 | George | H04W 76/22 |
| | | | | 370/310 |
| 2008/0284587 | A1* | 11/2008 | Saigh | H04M 1/72541 |
| | | | | 340/539.13 |
| 2011/0151890 | A1* | 6/2011 | Platt | G06Q 10/107 |
| | | | | 455/456.1 |
| 2012/0054712 | A1 | 3/2012 | Melvin, Jr. et al. | |
| 2012/0120793 | A1* | 5/2012 | Corti | H04L 45/04 |
| | | | | 370/228 |
| 2013/0333029 | A1 | 12/2013 | Chesla et al. | |
| 2014/0167929 | A1* | 6/2014 | Shim | G08C 17/02 |
| | | | | 340/12.5 |
| 2014/0173082 | A1* | 6/2014 | Shin | H04L 41/24 |
| | | | | 709/223 |
| 2015/0006737 | A1* | 1/2015 | Chen | H04L 5/0044 |
| | | | | 709/226 |
| 2015/0074741 | A1* | 3/2015 | Janakiraman | H04L 63/101 |
| | | | | 726/1 |
| 2015/0264580 | A1* | 9/2015 | Iwai | H04W 76/12 |
| | | | | 370/329 |
| 2015/0351096 | A1* | 12/2015 | Sidhu | H04W 72/0453 |
| | | | | 370/329 |
| 2016/0134564 | A1* | 5/2016 | Egi | H04L 41/12 |
| | | | | 370/401 |

OTHER PUBLICATIONS

Invitation to Pay Additional Fees for application PCT/US2015/061249, dated Feb. 29, 2016, 10pgs.

* cited by examiner

FIGURE 6 – MOBILE ACCESS

FIGURE 7 – MESSAGE TRANSMISSION

COMMUNICATION SYSTEMS

FIELD OF THE INVENTION

This invention relates to a method apparatus and system to improve transmission of messages through a communication network such as the world wide web (WWW).

The invention is directed to improving management or reliability of communications systems generally, but will be described with reference to a security system message communication system.

BACKGROUND OF THE INVENTION

Security systems, such as that described in U.S. Pat. No. 7,253,728, Telemetry System, (UHS Systems Pty Limited), the disclosure of which is incorporated herein by reference, include a plurality of customer terminals connected via a communication network to an intermediate supervision terminal having an associated database and a number of security company automation systems. The customer terminal may be adapted to interface a PSTN alarm system to a data communication network. Agency terminals may be included to adapt communications between the automation system and a data communication network. Each customer terminal is associated with at least one automation system, and the centralized database manages the distribution of traffic between each of the customer terminals and its corresponding automation systems.

The nature of databases means that use of the database to control these traffic flows may introduce delays in traffic flows and may also present a potential single point of failure. This is because of the complex structure of databases and the interlinking of the database fields. Thus a traffic flow control operation involves a large number of computer operations (flops). This in turn slows the operation and increases the possibility of the occurrence of an error or signalling network malfunction.

An example of a system that uses such a centralized server and database is given in iControl patent U.S. Pat. No. 8,335,842. The system described in this patent uses a network operations center facility to process communications and requires the customer terminals to obtain an assigned server address of the network operations center, and the customer terminals use this address in all subsequent communications.

FIG. 10 shows an alternative system of the prior art. This is a point to point arrangement as shown in which a customer terminal communicates directly over an IP or wide area wireless IP network, which may be cellular, to an IP enabled dialer receiver. While the simplicity of this arrangement improves its reliability and data security as sensitive service and customer data are contained in the edge devices, it lacks means to enable an operator of a dedicated communication system to locate faults in the communication system.

It is desirable to provide a communication system in which one or more of these disadvantages are mitigated.

It is also desirable to provide a communications system which facilitates communication between a user's mobile device and an associated customer terminal and supports additional facilities such as APIs, remote programming, control of home automation devices and remote video access.

It is desirable to provide a system and device which provides access to a data stream associated with a point-to-point communication system within a larger network for such purposes as management, fault location, provision of remote access to additional devices, and the like.

The following abbreviations are used in the description and drawings: AP—alarm panel
API—application programming interface
AT—agent terminal
AS—automation system
CDB—common database
CMC—communication management center
CMS—central monitoring station
CSG—central station gateway
CT—customer terminal
CTIDI—customer terminal identification information
DB—database
DR—dialler receiver
HTTPS—hypertext transfer protocol secure
I-DR—IP dialer receiver
I-AS—IP enabled automation system
IP—internet protocol
LAN—local area network
PR—proprietary router
PSTN—public switched telephone network
RFC—(Internet Taskforce) Request for Comment
RPS—remote programming software
TR—token register
UIDI—user identification information
URL—universal resource locator
VFNN—virtual full national number
VPN—virtual private network
WAN—wide area network
W-IP wireless IP network
WWW—world wide web

SUMMARY OF THE INVENTION

In one embodiment the invention enables the use of a distributed network architecture to facilitate communications between customer terminals and their associated automation systems.

In particular, the network may include one or more proprietary routers. A proprietary router is a router adapted to be incorporated into a WAN, while remaining under the control of a proprietor of a dedicated communication network, rather than being under the control of the WAN operator. The proprietary router may have proprietary interfaces adapted to communicate with associated terminals.

The proprietary router may include message processing means which may include a processor, message store, and software to direct the message towards a destination via an interface of the proprietary router.

According to an embodiment of the invention, there is provided a proprietary router (PR) adapted to be incorporated in a WAN, the proprietary router including:
a message switch (9.902);
a first interface (9.904);
a second interface (9.906);
and first message processing means (9.920);
the first message processing means including first message processing software,
wherein
the first message processing means is connectable to the first interface and the second interface via the message switch,
wherein
the first message processing means is adapted to extract a forwarding address from a message received on either the first or second interface, and to forward the message with the extracted address to the other of the first and second interfaces.

In this specification "connectable" refers to the ability of a router to selectively switch messages between interfaces.

The message processor may include a processor, message store, and software to direct the message towards a destination via an interface of the proprietary router.

The PR may include a remote programming software (RPS) interface (9.918) and RPS message processing means (9.928) by which the interfaces and processing means may be programmable.

The proprietary router may include a third (9.908), a fourth (9.910), and a fifth interface (9.912) interfaces and second message processing means (9.924), the third interface being adapted to receive image and/or audio data, the second message processing means being adapted to format the image and/or audio data for transmission via the fourth interface or the fifth interface.

The proprietary router may include a sixth interface (9.916), wherein the first message processing means is adapted to extract an alternative address from a message received on the first interface and the switch uses the alternative address to forward the message via the sixth interface.

The proprietary router may include a fourth interface (9.910) and a fifth interface (9.912) and third message processing means (9.922) wherein the third message processing means is adapted to provide access for a remote terminal (12.951) from either the fourth or fifth interface via the first interface to a first terminal (12.134), to enable management, configuration and status control of the first terminal.

The proprietary router may include seventh interface (9.918) and fourth message processing means, 9.928, wherein the fourth message processing means is adapted to carry (encapsulated) bidirectional serial traffic between the seventh interface and the first interface via the message switch,
the first terminal being adapted to regenerate the serial traffic from the encapsulated traffic to enable remote configuration of alarm systems adapted to communicate via the PSTN.

The proprietary router may include an eighth interface (9.914) and third message processing means, whereby data received via the first interface is modified by the third message processing means for transmission via the eighth interface.

The proprietary routers may enable access to a data stream associated with a point-to-point communication system within a larger network for such purposes as management, fault location, provision of remote access to additional devices, and the like.

The proprietary router may include an address store containing the address of the communications management center to enable the proprietary router to forward messages to the CMC.

According to another embodiment of the invention, there is provided a communication system including one or more proprietary routers incorporated in a WAN, the router or routers including at least:
a first interface (9.904),
a second interface (9.906), and
first message processing means (9.920),
the first message processing means including first message processing software, wherein the first message processing means is connectable to the first interface and the second interface,
wherein
the first message processing means is adapted to extract a forwarding address from a message received on either the first or second interface, and to forward the message with the extracted address to the other of the interfaces,
the system including at least one first terminal,
each first terminal including software compatible with the first message processing software,
the forwarding address being used to forward the message to a corresponding second terminal.

The communication system may include at least a first proprietary router and a second proprietary router (CSG), wherein first proprietary router forwards the message via the second proprietary router, and wherein the second proprietary router is adapted to forward the message to the second terminal.

The communication system may include a message format converter (I-DR) adapted to convert the format of the message from a first format to a second format compatible with the second terminal.

The communication system may include a communications management center (CMC), wherein each proprietary router is adapted to interface with the CMC.

The first terminal may include one or more of:
an alarm system communicator adapted to be connected to an alarm system,
an alarm system,
home automation control gateway.

The second terminal may be an alarm automation system.

The message processors may include proprietary software adapted to facilitate message handling.

According to another embodiment of the invention, there is provided a message communication system including a plurality of customer terminals (CTs) associated with at least one associated alarm reporting means (AP), one or more proprietary routers, and at least one automation system (AS) with which at least one of the CTs is associated, the customer terminals and the or each router being adapted to communicate via a first communication network, the or each proprietary router and the automation systems being adapted to communicate via a second communication network,
wherein
each customer terminal is configured with:
at least one intermediate communication address of at least one of the proprietary routers;
at least one destination communication address associated with at least one associated automation system;
customer terminal identification information;
wherein
the customer terminal is adapted to format alarm signals from the alarm reporting means for transmission via one of the proprietary routers to an associated one of the automation systems without the involvement of a centralized database and/or a centralized server.

The message communication system may include one or more central station gateways (CSGs) associated with each automation system.

The destination addresses may be IP addresses of associated CSGs.

According to a further embodiment of the invention there is provided a message communication system including a mobile device access arrangement including:
one or more customer terminals;
one or more proprietary routers;
an authentication server;
a common database used to authenticate user ID information (UIDI);

a token register;
wherein,
each proprietary router is adapted to generate temporary tokens for each associated CT and transmit the tokens to the token register for storage,
wherein the authentication server is adapted to receive an access request from a mobile device, the access request including user identification information (UIDI),
the association of a UIDI with at least one associated CT being stored in the common database,
the authentication server being adapted to forward the access request to the common database for validation,
wherein,
on validation of the access request, the token register returns a token to the authentication server, with an address for an associated proprietary router which is associated with the selected CT with which the UIDI is associated,
the authentication server passes the token and the address of the associated proprietary router to mobile device to enable the mobile device to connect to the CT via the associated proprietary router.

The UIDI may be associated with two or more associated CTs, and the common database can send a list of associated CTs to the authentication server which can forward the list to the mobile device and wherein the user can select one of the associated CTs in the list to obtain access to the selected CT.

The proprietary router can generate tokens associated with each CT associated with the router for storage in the token register.

The token register may be incorporated in the common database.

According to a further embodiment of the invention, there is provided a method of configuring a customer terminal (CT) from a common database (CDB) via a communication network to enable the CT to access at least one operational proprietary router, the customer terminal initially including at least one stored address for at least one default proprietary router, the CDB including configuration information for the CT, wherein one or more proprietary routers are incorporated in the communication network, the configuration message including the address or addresses of one or more operational proprietary routers,
the method including the steps
at the CT, using the or one of the stored addresses for one of the default proprietary routers to send a configuration request to the CDB via the default proprietary router associated with the stored address, the configuration request including identification information for the CT (CTIDI),
at the CDB, using the CTIDI to select configuration information for the CT, forming a configuration message,
transmitting the configuration message to the CT via the default proprietary router, at the CT, using the configuration information to configure the CT, including storing the address of one or more of the operational proprietary routers for use by the CT to transmit messages.

According to a further embodiment of the invention, there is provided a method of transmitting a message from a customer terminal (CT) through a communication network to an automation system (AS) with which the CT is associated, the communication network including at least a first operational proprietary router, the CT including one or more operational proprietary router addresses:
the method including the steps of:
at the CT, forming a message including CT identification information (CTIDI), and AS location information;
using the first operational proprietary router address to send the message to the first operational proprietary router;
at the operational proprietary router, using the AS location information to send the message to the AS.

The communication network may include at least a first and a second operational proprietary router, the method including the step of sending the message from the first operational proprietary router to the AS via a said second operational proprietary router, replacing the AS location information by the address of the second operational proprietary router, the second operational proprietary router using the AS access information to enable adaptation of the format of the message to a format used by the AS.

The second operational proprietary router may be included in a central station gateway (CSG).

The step of forming a message may include incorporating AS access information in the message, and wherein the method includes the further step of using the AS access information to enable the message to be received by the AS.

The AS access information may be in the form of a phone number.

An additional feature of the security system of the invention is the facilitation of communications between a mobile device and an associated customer terminal via a distributed architecture communication network.

According to an embodiment of the invention, there is provided a security system including a plurality of customer terminals, one or more proprietary routers, one or more automation systems, each customer terminal being associated with an associated one of the automation systems, wherein each customer terminal includes at least one communication address of at least one of the routers, the router including a routing table to forward the message to the associated automation system.

The security communication system may include one or more common databases.

The common database may be used to update the routing tables in the plurality of routers.

The security system may include one or more authentication servers adapted to establish communication between a mobile device and an associated customer terminal via a corresponding one of the routers.

According to a further embodiment of the invention, there is provided a security communication system including a plurality of customer terminals, a plurality of routers, a plurality of automation systems, a plurality of CSGs (Central Station Gateways), each CSG being associated with an associated one or more automation systems, each customer terminal being associated with an associated one of the CSGs, wherein each customer terminal includes at least one communication address of at least one of the routers, the router including a routing table to forward the message to the associated CSG.

The security system may include a common database.

The proprietary routers may be adapted to store data in the common database.

The common database may be adapted to update the routing tables in the plurality of proprietary routers.

The security system may include one or more authentication servers adapted to establish communication between a mobile device and an associated customer terminal.

According to a further embodiment of the invention, there is provided a method of transmitting an alarm signal from an alarm panel to an automation system, the method including the steps of transmitting the alarm signal to a customer terminal, the customer terminal including one or more stored addresses, the or each stored address enabling a customer terminal to communicate with a selected one of one or more proprietary routers, wherein the customer terminal converts the alarm signal to a first message including the address of the selected proprietary router and transmits the first message to the selected proprietary router, each proprietary router re-addresses the message to the associated automation system.

According to another embodiment of the invention, there is provided a method of transmitting an alarm signal from an alarm panel to an automation system, the method including the steps of the alarm panel transmitting the alarm signal to an associated customer terminal, the customer terminal including one or more stored addresses, the or each stored address enabling the customer terminal to communicate with a selected one of one or more proprietary routers, wherein the customer terminal converts the alarm signal to a first message including the address of the selected proprietary router, each proprietary router re-addresses the first message to a selected one of one or more central station gateways, and wherein the selected central station gateway—being also a proprietary router—converts the message to a converted message in a format suitable for an associated automation system, and transmits the converted message to the associated automation system.

According to a still further embodiment of the invention, there is provided a method of establishing a secure communication path between a mobile device and a specified customer terminal, the method including the steps of, at the mobile device, sending a request for access to the customer terminal to a broker server or authentication server, at the authentication server, sending an authorization request to a communications management center including a common database containing details of the specified customer terminal and any users that are authorized to access the specified customer terminal, receiving at the authentication server an authorization or rejection message from the communications management center, and, in the event of the authentication server receiving an authorization, enabling the mobile device to access a specified proprietary router operating as a tunnel or VPN router, the proprietary router enabling a virtual private network connection between the mobile device and the specified customer terminal.

The proprietary router can generate tokens and transmit them to a token register.

The token register can also store the address of the corresponding proprietary router and the addresses of its associated customer terminals.

The token register can send a token to the authentication server after the identification information from the mobile device is authenticated.

BRIEF DESCRIPTION OF THE DRAWINGS

An embodiment or embodiments of the present invention will now be described, by way of example only, with reference to the accompanying drawings, in which.

Figure 1:
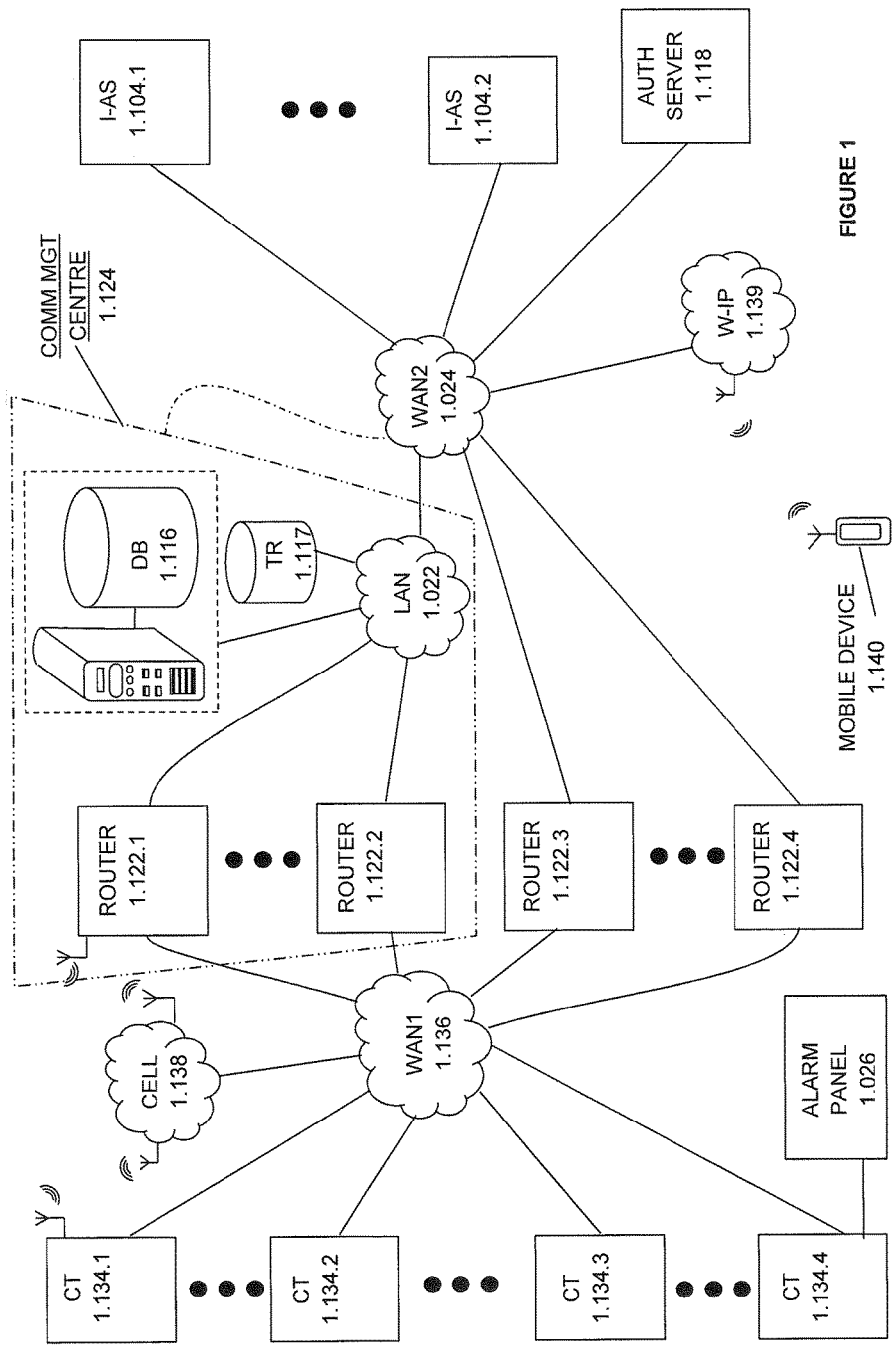
FIG. 1 is a block diagram illustrating basic elements of a network architecture according to an embodiment of the invention.

The numbering convention used in the drawings is that the digits in front of the full stop indicate the drawing number, and the digits after the full stop are the element reference numbers. Where possible, the same element reference number is used in different drawings to indicate corresponding elements.

The drawings are intended to illustrate the inventive features of the embodiments illustrated and are not necessarily to scale. The orientation of the drawings is chosen to illustrate the inventive features and is not necessarily indicative of the orientation of the device in use. The symbols used to indicate the various items are not actual representations of the physical appearance of the item.

DETAILED DESCRIPTION OF THE EMBODIMENT

The invention will be described with reference to the embodiments illustrated in the accompanying drawings.

FIG. 1 shows an alarm reporting network according to an embodiment of the invention.

In FIG. 1, two wide area networks, WAN1 & WAN2 are shown for the sake of clarity, but it will be apparent to a person skilled in the art that these two WANs may be the same network.

The network includes a plurality of customer terminals such as customer terminals 1.134.1 . . . 1.134.4, wide area networks such as WAN1 (1.136), and WAN 2 (1.024), routers 1.122.1 . . . 1.122.4, and security company automation systems 1.104.1 . . . 1.104.2.

In addition communications management center 1.124 may include a database 1.116 and associated server. In practice, the communications management center may include a number of databases and associated servers and proprietary routers, and additional servers may also be linked to the management center, as discussed further in relation to FIG. 3. The communications management center common database may include details of each customer terminal and the addresses of the associated central station gateways, which information can be used in the configuration of the customer terminal. Optionally the common database may also include customer details. The communications management center may include a LAN 1.022 which can be connected to the common database 1.116 and to WAN2 1.024. The communications management center may optionally have a direct connection to WAN2 1.024.

The common database 1.116 may include information such as:
customer security account details
customer terminal identification customer terminal address
customer terminal configuration information
customer terminal and router associations
addresses of associated central station gateways (CSGs)
default router addresses (e.g., URL's)
Path supervision heartbeat rate
association of central monitoring station and central station gateways
customer mobile device login authentication information association with a customer terminal
An encrypted backup copy of the customer terminal configuration information can be maintained in case the customer terminal requires replacement or a configuration re-load The use of URLs to connect the CT with proprietary routers enables dynamic reconfiguration of the network as domain name servers can resolve the URL to a new IP address whenever a proprietary router is removed from the network.

An embodiment of the invention provides a process for configuring a customer terminal (CT) to operate within a specific point-to-point or point-to-multipoint communication system. The customer terminal requiring configuration may use a pre-installed default proprietary router address, which may be a URL, to contact a common database via a default proprietary router over a communication network such as a WAN, and the common database downloads configuration information to the CT via the default proprietary router. The configuration information may include one or more addresses for one or more operational proprietary routers.

The term "operational" is used here to indicate that the router is used in normal message transmission, as distinct from its use in the CT configuration process. A proprietary router may have a default proprietary router address and an operational proprietary router address, so it may be used in both the configuration process and in normal message transmission. In this case, the router may act as a default router if a message using the default proprietary router address is received or if a message is appropriately formatted, and the router may act as an operational router if a message using the operational proprietary router address is received or the message is differently formatted. Where the configuration messages are differently formatted from the operational messages, the default proprietary router address and the operational proprietary router address may be the same.

In a further embodiment of the invention, when a customer terminal, such as 1.134.4 is initially installed, it is configured with at least one default address for a proprietary router, such as 1.122.1. In addition, the configuration information may include the IP address of one or more central station gateways (CSGs) with which the customer terminal is associated. When the customer terminal is activated the customer terminal contacts the default proprietary router. The default proprietary router establishes a connection, such as a virtual private network link, between the customer terminal and the communications management center 1.124, which includes a common database 1.116. The common database 1.116 then configures the CT with data as listed above, including sending the addresses of one or more proprietary routers to the customer terminal. The customer terminal stores these addresses, disconnects from the default proprietary router and connects to one of the nominated proprietary routers for use in sending alarm system communications. The default proprietary router may be configured to forward all appropriately formatted messages received from customer terminals using the default proprietary router address to the CMS. More than one default proprietary router address may be provided in the customer terminal to provide redundancy in the event that a first such default proprietary router is inoperable. As discussed above, where different message formats are used to distinguish configuration messages from operational messages, the default proprietary router address may be the same as the operational proprietary router address. The customer terminal may also be pre-configured with the address of an associated CMS or its associated CSG.

The central station gateway (CSG) may be a proprietary router configured to operate in a specified mode.

Each central station gateway may be associated with one or more central station automation systems. The central station gateways may include an association table linking address information to central station automation systems. The address information may include virtual phone numbers. The association table can correlate virtual phone numbers received in messages from customer terminals with corresponding central station automation systems.

Authentication server 1.118 is connected to WAN2 1.024 and is adapted to facilitate setting up secure communication paths from mobile devices to associated customer terminals. The communications path between the mobile device and the proprietary router may uses a secure communications protocol such as the known HTTPS protocol. The authentication server may be adapted to communicate directly via wireless IP network 1.139, or indirectly via WAN2 1.024 to the wireless IP network where the wireless IP network is shown as linked to WAN2. Thus a mobile wireless device, such as smart phone 1.140 fitted with a specifically designed app (application software), referred to herein as an access app, can communicate with the authentication server 1.118.

Each customer terminal can be in communication with an alarm panel such as 1.126, only one alarm panel being shown to avoid cluttering the drawing.

Alarm panel 1.126 is connected via a subscriber communication terminal such as customer terminal 1.134.4 to a security company automation system such as 1.104.1 via at least one communication network 1.024, 1.136, and a router such as 1.122.3.

Each customer terminal has one or more stored CSG addresses and virtual phone numbers. The CSG address allows the router to deliver the message from the CT to the CSG. The virtual phone number (VFNN) is used by the CSG to deliver the message from the CT to the associated automation system using a variety of means, including PSTN redialer, IP redialer and IP tunnel (see FIG. 4). The VFNN is used in conjunction with a central station dialer receiver to emulate a PSTN call and ensure compatibility with the known dialer receiver features such as DNIS which enables the segregation of information from different customers.

The proprietary routers such as 1.122.1, 1.122.2 may be co-located with the communications management center and access the common database 1.116 via a LAN 1.022. Alternatively, the proprietary routers may be located remotely from the communications management center and communicate with the communications management center common database 1.116 via a WAN such as 1.1024.

The use of a plurality of proprietary routers combined with the storage of routing addresses in the customer terminal avoids reliance on the common database 1.116

The database is not involved in the transmission of alarm and other messages between the customer terminal and the central station gateway.

When a mobile device user wishes to access the user's alarm panel using mobile device 1.140, the user uses the access app to contact the authentication server 1.118 via a wireless (cellular or WiFi) IP network 1.139 or via wireline IP network.

The automation systems of FIG. 1 are adapted to communicate directly via a WAN.

However, legacy automation systems are adapted to communicate via a serial connection generally connected to a dialer receiver which is used to terminate incoming calls from alarm systems on the POTS network. Accordingly, FIG. 2 shows how a network having legacy automation systems may be adapted for communication via a digital data communication network.

Figure 2:
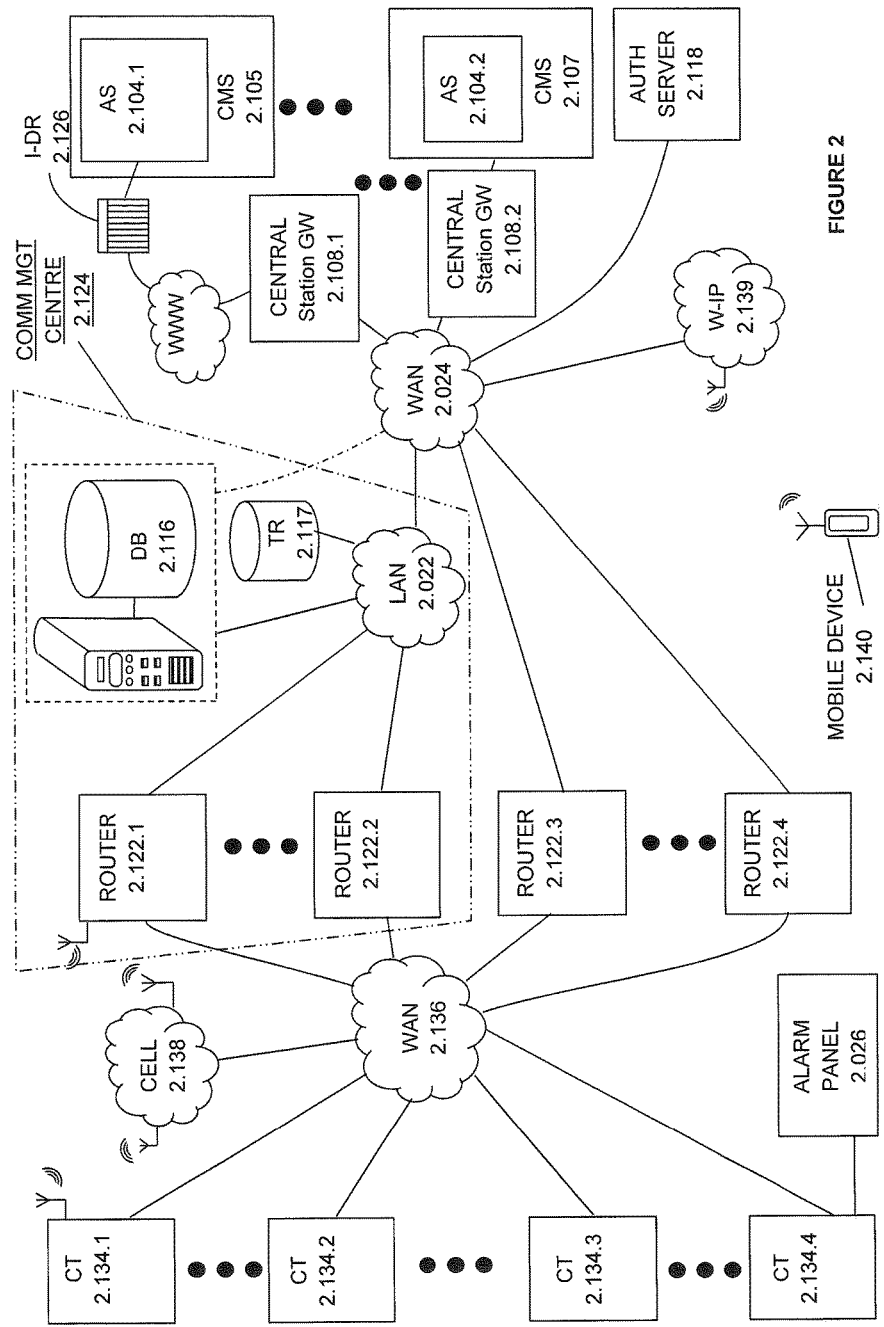
FIG. 2 is a block diagram illustrating basic elements of a further network architecture according to an embodiment of the invention.

FIG. 2 is substantially similar to the network of FIG. 1, except that the automation systems are shown as incorporated in central monitoring stations (CMS) such as 2.105 and are connected to the communication network through central station gateways (CSG) such as 2.108.1, 2.108.2. The central monitoring stations may include an automation system, such as 2.104.1, 2.104.2. The central station gateways are adapted to translate communications between the digital environment and the automation system environment, as described, for example, in the above referenced US patent U.S. Pat. No. 7,253,728.

The CSGs 2.108.1, 2.108.2 may include the identification information and addresses of customer terminals associated with the CMS to enable downstream signalling.

Proprietary routers 2.134.1, 2.134.4 are programmed to generate access tokens and send them to a token register 2.117. The token register records the access tokens and the associated proprietary router. The access tokens can be used to authorize the proprietary router to connect the data traffic associated with a mobile device with the nominated CT via the tunnel maintained by the proprietary router and the associated CT.

Figure 3:
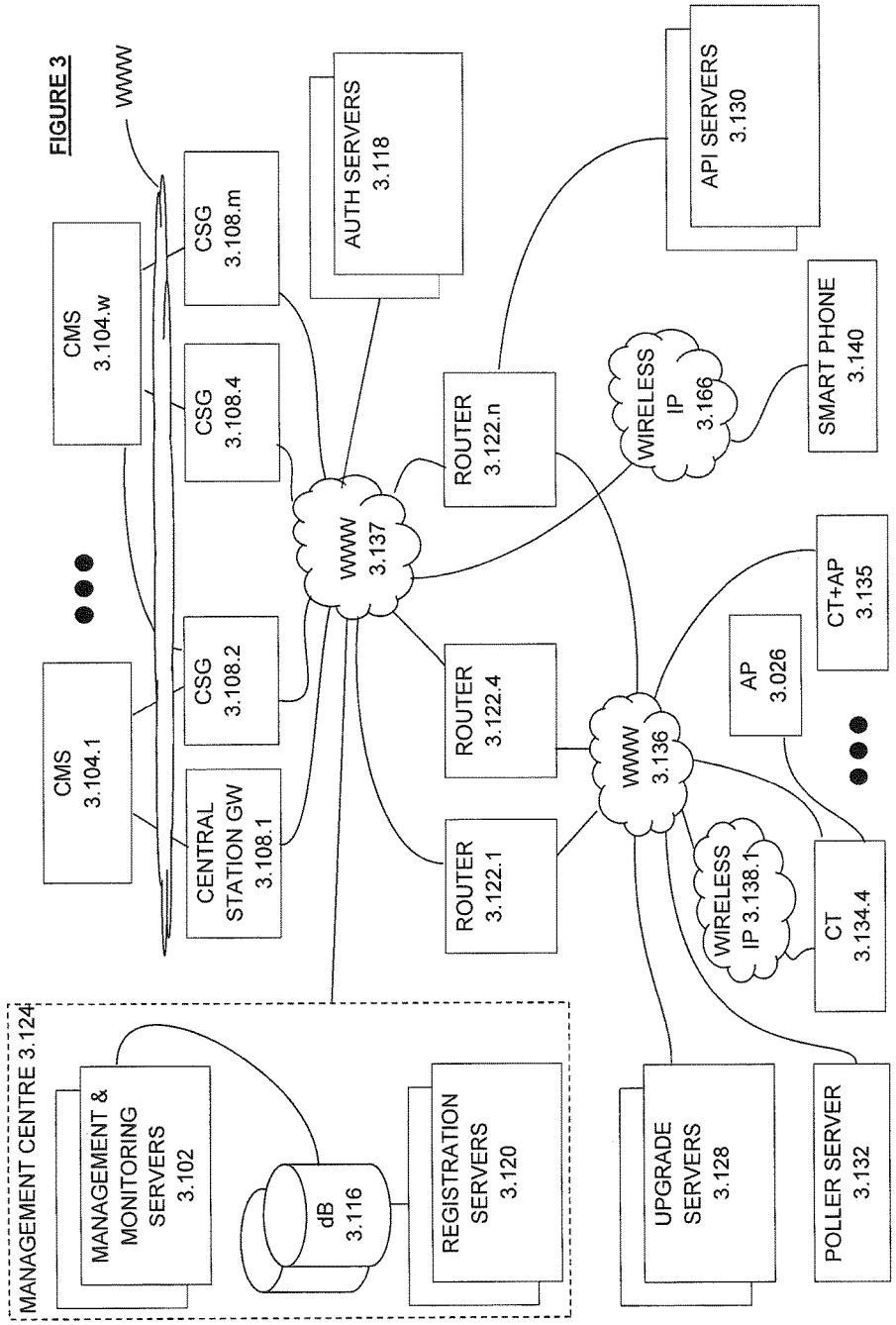
FIG. 3 illustrates additional features of a network according to an embodiment of the invention.

FIG. 3 shows an alarm communication network according to an embodiment of the invention.

The system shown in FIG. 3 includes:
Communications management center 3.124 including communications management and monitoring servers 3.012, common databases 3.116, registration servers 3.120;
customer terminal 3.134.4;
alarm panel 3.026;
proprietary routers 3.122.1 . . . 3.122.4;
central station gateways 3.108.1 . . . 3.108.*m;*
automation systems 3.104.1 . . . 3.104.*w;*
authentication servers 3.118;
API servers 3.130;
upgrade servers 3.128;
poller servers 3.132;
wide area wireless IP networks 3.138.1, 3.139;
a customer terminal 3.135 which combines the functions of an alarm panel and a customer terminal;
wide area network 3.136.

A mobile device such as smart phone 3.140 is also shown. The mobile device is fitted with an access app.

The wireless networks 3.138.1 and 3.138.2 may be the same or different networks.

While the authentication server, routers and central station gateways may connect with other elements of the system via wide area networks, the wide area networks are not shown to simplify the drawing.

The customer terminal 3.124.4 includes one or more addresses of corresponding proprietary routers such as 3.122.1 & 3.122.2, enabling the customer terminal to communicate with a selected proprietary router as needed.

The customer terminal 3.134.4 is adapted to facilitate communication between an alarm panel 3.026 and a security company's automation system 3.104.1 via a communication network.

The customer terminal converts the alarm message to a format suitable for transmission via a communication network to a specific destination using address information installed in the customer terminal during the configuration process to transmit the message via a proprietary router to its destination.

When the alarm panel 3.026 sends an alarm signal to the customer terminal 3.134.4, the customer terminal converts the alarm signal to a packetized message format appropriate for transmission across the digital network, adding appropriate packet network addressing and overhead such as header information and includes the CSG address and VFNN. The header information can include identification of the customer terminal. The customer terminal uses a selected one of the stored addresses to forward the packetized message to the selected proprietary router 3.122.4 over a permanent IP tunnel (VPN).

A similar process may be carried out by a customer terminal 3.135 incorporating alarm panel functionality.

The proprietary router then uses the address information embedded in the message from the customer terminal to route the message to the central station gateway 3.108.2 with which the customer is registered, and adds the appropriate address information to the packetized message and forwards the re-addressed message to the corresponding central station gateway.

Each CSG may be associated with one or more CMSs. The CSG may include a look-up table to enable the CSG to determine to which CMS the message is to be delivered using the VFNN included in the received message or other means. To this end the message includes information to be used by the CMG to identify the recipient CMS.

Internet Engineering Taskforce Request for Comment RFC5572 describes a tunnel broker in the following terms: A tunnel broker with the Tunnel Setup Protocol (TSP) enables the establishment of tunnels of various inner protocols, such as IPv6 or IPv4, inside various outer protocols packets, such as IPv4, IPv6, or UDP over IPv4 for IPv4 NAT traversal. The control protocol (TSP) is used by the tunnel client to negotiate the tunnel with the broker. A mobile node implementing TSP may be connected to both IPv4 and IPv6 networks whether it is on IPv4 only, IPv4 behind a NAT, or on IPv6 only. A tunnel broker may terminate the tunnels on remote tunnel servers or on itself. The proprietary router may include tunnel server software, and the CT may include tunnel client software to enable it to terminate the tunnel between the CT and the proprietary router As described in RFC5572, a proprietary router acting as a tunnel server can set up a tunnel in response to a request from a tunnel client, such as a CT The mobile terminal may include HTTPS software to enable it to communicate securely with the CT using IP.

The proprietary routers may be tunnel servers. Thus a customer terminal 3.134 may be adapted to communicate with a corresponding one of the alarm company's automation terminals (3.104.1) via a proprietary router acting as a tunnel server 3.122.4 using one or more of the communication interfaces described below with reference to FIG. 4. As shown in FIG. 3, the customer terminal 3.134.4 is adapted to communicate with a proprietary router acting as a tunnel server 3.122.4 via an Ethernet network 3.136. The customer terminal 3.134.4 may initiate the setting up of a durable/permanent tunnel path, to the proprietary router by requesting the proprietary router acting as a tunnel server 3.122.4 to set up the tunnel. The proprietary router acting as a tunnel server then routes all message destined to the CSG over its WAN port.

Thus secure communication may be established between the customer terminal 3.134.4 and the proprietary alarm monitoring station 3.104.1 without the need for the signalling associated with alarm delivery to access the database 3.116.

The configuration of the proprietary routers may be updated as needed from the database 3.116.

The authentication server (3.118) and the proprietary routers (3.122.1 . . . 3.122.n) may be enabled for secure communication using, for example, HTTPS. In a further embodiment of the invention, a path may be established between a mobile device (3.140) such as a smart phone with an access app and customer terminal 3.134. In this embodiment a person may use a mobile device such as a mobile phone or other wireless computing device loaded with an access app to interrogate the customer terminal by requesting authentication server 3.118 to establish a tunnel between the mobile device 3.140 and customer terminal 3.134.

The proprietary routers may generate temporary tokens which the proprietary routers are then able to recognize in granting access from a mobile terminal to customer terminals associated with the proprietary router which generated the tokens. The tokens are sent by the proprietary router to a token register, which may be the common database 3.116.

The user of the mobile device 3.140 activates the access app which accesses the authentication server 3.118 via wireless IP link 3.166. The authentication server requests user identification information (UIDI) such as the user's username and password. The authentication server then uses the user identification information to request access authorization from the common database 3.116. Provided that the authentication is successful, the database issues the latest token as well as the address of a proprietary router, e.g., 3.122.4 to the authentication server. The authentication server then provides the token and the address of the proprietary router to the mobile device 3.140. The mobile device then connects to the proprietary router using the address obtained from database by way of the authentication server. The token is recognized by the proprietary router, and the mobile device is connected to the customer terminal 3.134.4 via the tunnel in place between the customer terminal and the proprietary router 3.122.4.

As the connection between the mobile device and the authentication server, and between the mobile device and the proprietary router are carried out using IP, the disconnection and reconnection process is rapid.

Figure 4:
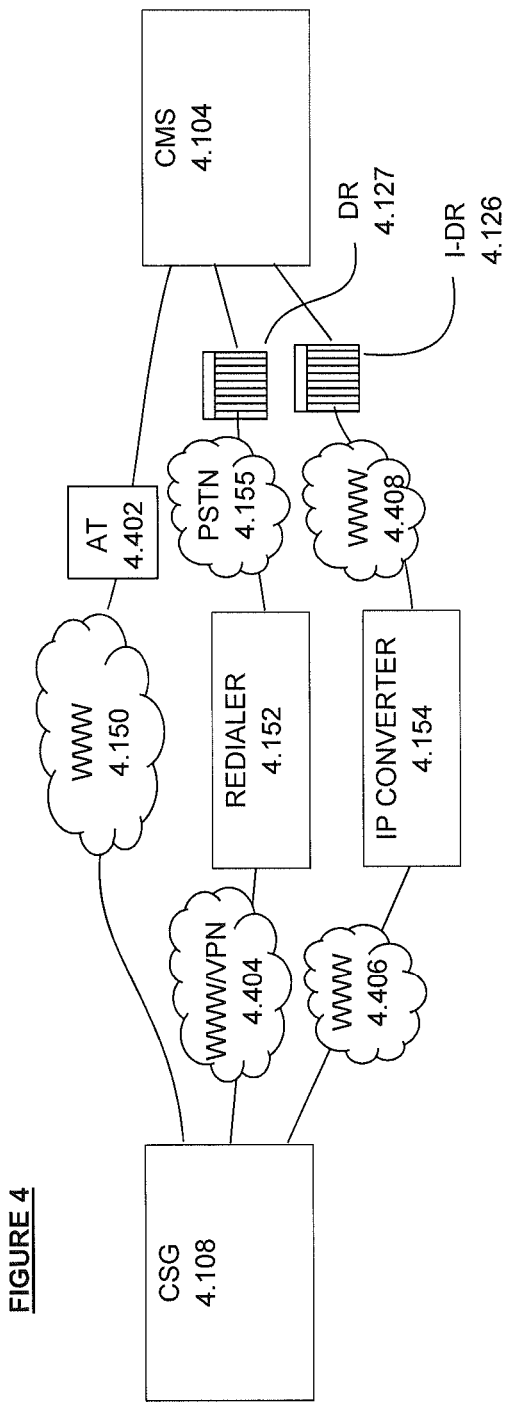
FIG. 4 illustrates arrangements for the connection of a CSG to a security company automation system.

FIG. 4 illustrates alternative means of connecting a central station gateway to an automation system. Various modes of connecting to an automation system are described in Australian provisional application PCT/AU2014/050140 Improvements in Central Station Connectivity, (UHS Systems Pty Ltd), the disclosure of which is incorporated herein by reference. One difference between embodiments of the present invention and those of PCT/AU2014/050140 is that, in the embodiments of the present invention shown in FIGS. 2, 3, 4, and 8, the automation system is incorporated in a central monitoring station (CMS). As described in one embodiment in AU2013902859, the automation system may be linked with the IP network using a number of different techniques as described with reference to FIG. 4 of this specification.

A first arrangement has WWW 4.150 and agency terminal 4.402 between CSG 4.108 and CMS 4.104.

In a second arrangement, a VPN 4.404 may be established through an IP network upstream of CSG 4.108. The VPN links to a redialer 4.152, the PSTN 4.155, and dialer receiver 4.127 which connects to CMS 4.104

A third pathway may be via 4.406, IP converter 4.154, IP network 4.408, IP dialer receiver 4.126 to CMS 4.104.

Similar arrangements are described in PCT/AU2014/050140. Each arrangement enables bidirectional conversion of the format used in the CMS for use with an IP network.

The automation system may be adapted to receive input messages or signals in a specific format. In the example shown in FIG. 4, the central station gateway 4.108 is connected to the automation system 4.104 via a data switch 4.150, a redialled 4.152, and an IP tunnel 4.154. The central station gateway may be adapted to receive messages in a first protocol or format and to convert the messages to a format suitable for the automation system while not modifying the message contents.

Figure 5:
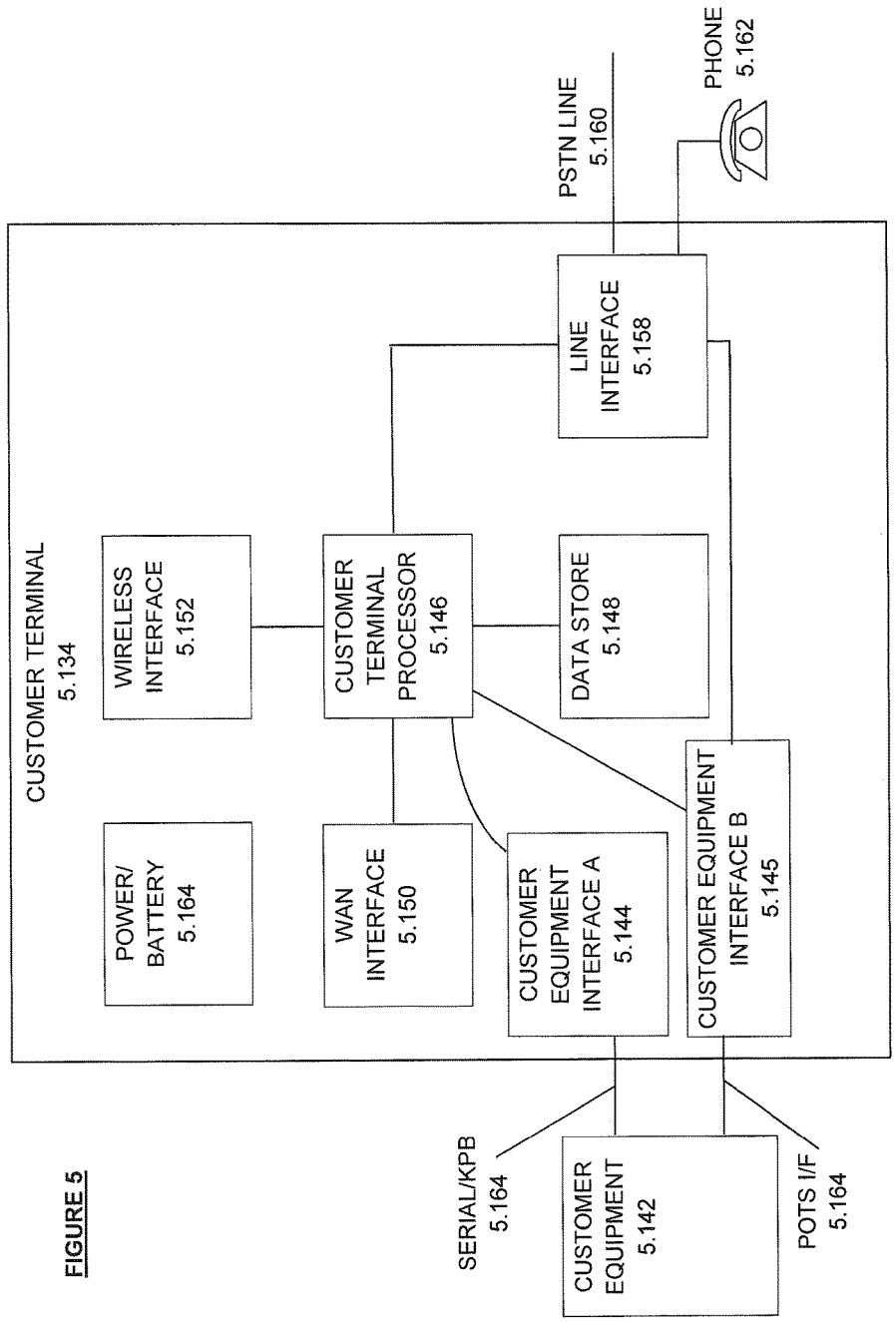
FIG. 5 illustrates a customer terminal and associated customer equipment.

FIG. 5 shows functional elements of a customer terminal according to an embodiment of the invention.

The customer terminal 5.134 includes:
  a processor 5.146;
  one or more upstream communication interfaces, such as:
    a wireless interface 4.152;
    an ethernet module 5.150;
    a POTS line interface 5.158;
  a data store 5.148;
  a first customer equipment interface module 5.144.
  a second customer equipment interface module 5.145.

Optionally a POTS splitter may be included between the line interface and the customer terminal processor to enable the inclusion of an XDSL interface, as described in U.S. Pat. No. 7,253,728. A customer equipment panel 5.142 connects to the customer equipment interfaces 5.144, 5.145 on the downstream side of the customer terminal. Customer equipment interface 5.144 may be a serial interface connected to a serial port of the customer equipment panel 5.142, e.g., via the key pad bus of the customer equipment panel.

The data store 5.148 may include one or more addresses enabling the customer terminal to communicate via one of the upstream communication interfaces with a selected router as described herein. The addresses may be in the form of "virtual phone numbers"

Figure 6:
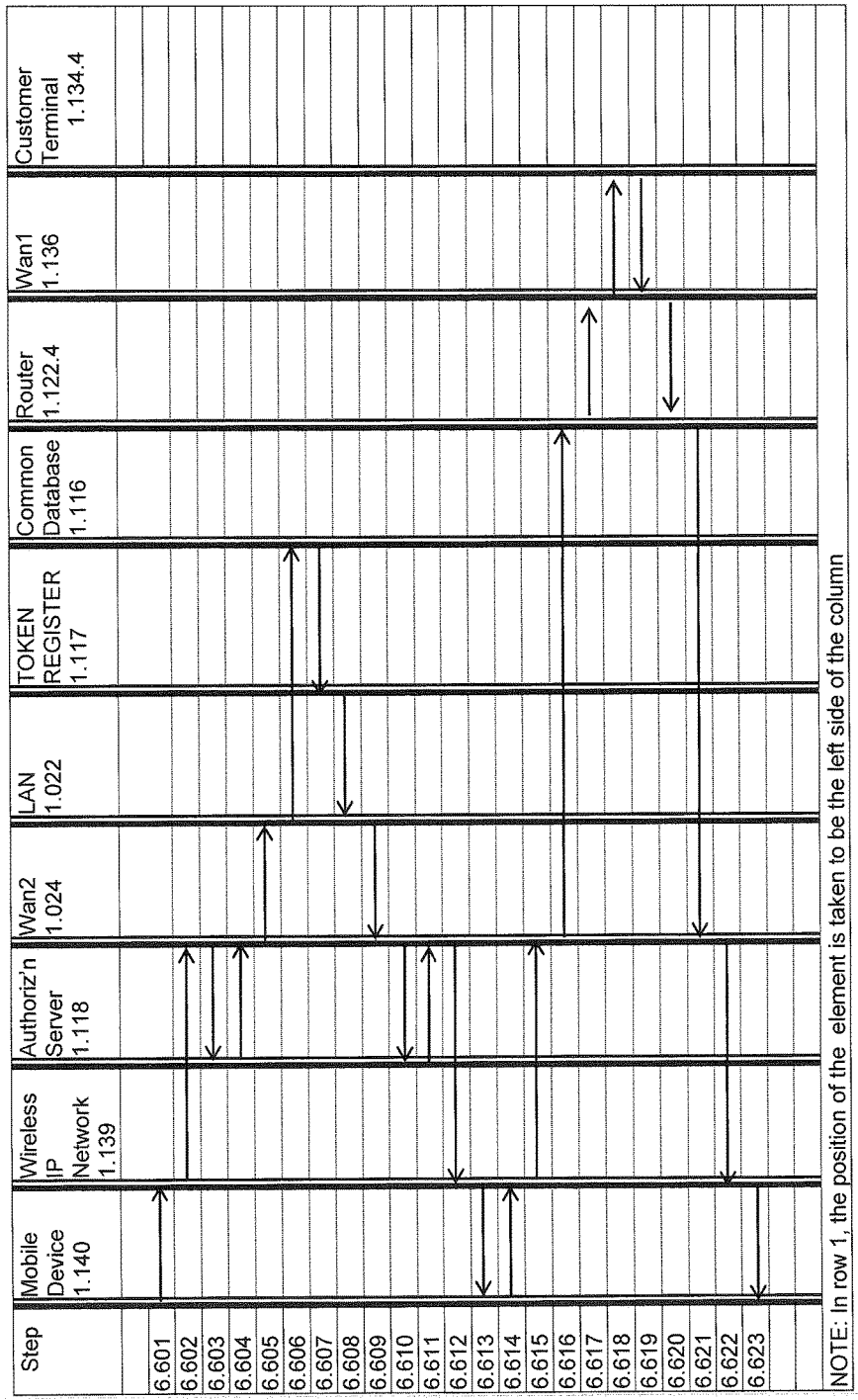
FIG. 6 is a flow chart illustrating the process of establishing access from a mobile device to a customer terminal according to an embodiment of the invention.

FIG. 6 illustrates the process of establishing communication between a mobile device 1.140 and customer terminal 1.134.4, primarily with reference to FIGS. 1 & 3.

Figure 7:
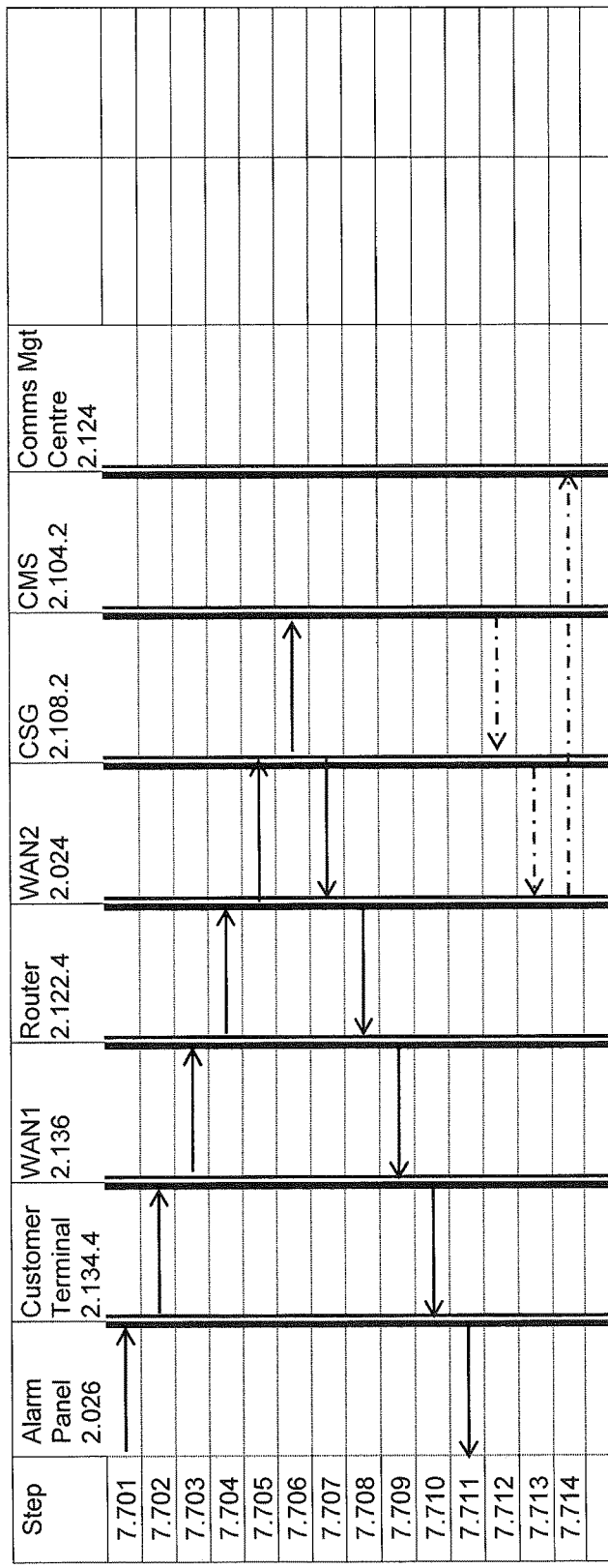
FIG. 7 is a flow chart illustrating the reporting of an alarm from an alarm panel to an automation system according to an embodiment of the invention.

In FIGS. 6 and 7, the element is taken to be the left side of the corresponding column.

When a mobile device user wishes to access the video information associated with a customer terminal, the user activates the access app in mobile device 1.140, and enters user identification information, e.g., username & password. The access app then uses the authorization server IP address to send an access request message containing the user identification information to the authentication server 1.118 via the wireless IP network 1.139 and WAN2 1.024 (steps 6.601, 6.602, 6.603).

The authentication server 1.118 then forwards the access request to the token register 1.117 via WAN2 1.1024, LAN 1.022 (steps 6.604, 6.605, 6.606).

When the common database has verified the user identification and established the identity of the customer terminal with which the user is associated, the token register sends the access token and the address of the proprietary router 1.134.4 with which the customer terminal 1.122.4 is associated to the authorization server via LAN 1.022 and WAN2 1.024 (steps 6.007, 6.608, 6.609).

The authorization server sends the access token for the proprietary router with which the customer terminal is associated and redirects the mobile device 1.140 to that router. The authorization server then sends the access token to the mobile device 1.140 via WAN2 1.024 and wireless IP network 1.139 and directs the mobile device to the associated proprietary router 1.134.4 (steps 6.610, 6.611, 6.612).

The mobile device 1.140 then switches to the proprietary router 1.122.4 via the wireless IP network and WAN2 (steps 6.613, 6.614, 6.615).

The proprietary router 1.122.4 then links the mobile device 1.140 to the customer terminal 1.134.4 through the established IP tunnel via WAN1 1.136 (steps 6.616, 6.617).

The customer terminal may include a web server delivering web pages with which the access app in the mobile device is adapted to communicate.

The customer terminal communicates with the mobile device via a reverse path

Information can thus flow from the customer terminal 1.134.4 to the mobile device 1.140 via WAN1, proprietary router 1.122.4, WAN2 1.024, wireless IP network 1.239 established (steps 6.618, 6.619, 6.620, 6.621, 6.622). Note that WAN1 and WAN2 may be the same network and are shown as separate networks to aid clarity of description.

Thus a bidirectional communication is established between the mobile device 1.140 and customer terminal 1.134.4.

FIG. 7 illustrates the process of reporting an alarm signal from the alarm panel to the automation system primarily with reference to FIG. 2. In this example, customer terminal 2.134.4 is associated with central monitoring station 2.107 and its automation system 2.104.2.

At step 7.701, the alarm panel 2.026 reports an alarm signal to the customer terminal 2.134.4.

The customer terminal 2.134.4 includes one or more stored addresses which were loaded when the customer terminal was configured by the communications management center. These addresses enable the customer terminal to communicate with one or more corresponding proprietary routers. The customer terminal selects one of the stored addresses and generates a message in an appropriate format, such as internet protocol. The message includes information identifying the sending customer terminal and information defining the alarm signal received from the alarm panel. In this example, it is assumed that the customer terminal 2.134.4 selects the stored address for proprietary router 2.122.4.

At steps 7.702, 7.703, the customer terminal 2.134.4 sends the message via WAN1, 2.136 to the proprietary router 2.122.4 corresponding to the stored address selected by the customer terminal 2.134.4. The customer terminal identification information in the message can be used to enable the proprietary router to identify the sending customer terminal 1.134.4.

The proprietary router may include a look-up table or routing table which associates the customer terminal with an associated central station gateway, in this example central station gateway 2.108.2. Alternatively, the association may be with the automation system or its CMS, in this example automation system 1.104.2 (FIG. 1), in the case where the automation system or its CMS is adapted to communicate via the digital network.

In alternative process, the customer terminal may include a location identifier for the CSG, such as the IP address of the CSG in the message, and the router can use this IP address to forward the alarm message to the CSG via WAN2. The CSG address information can be, for example, the IP address of the CSG 2.108.2 associated with CMS 2.107. The CSG address information can be loaded into the customer terminal from the communication management center during configuration of the customer terminal.

At steps 7.704, 7.705, the proprietary router 2.122.4 forwards the message via WAN2, 2.024, to the central station gateway 2.108.2. The CSG can be identified from customer terminal identification stored in the proprietary router's look-up table and included in the message from the customer terminal. In the alternative embodiment mentioned above, the customer terminal may include the CSG IP address in the alarm message, and the proprietary router can utilize this address to forward the alarm message to the CSG.

At step 7.706, format conversion means associated with the central station gateway converts the message to a format appropriate for the automation system 2.104.2 and forwards the converted message to the automation system 2.104.2.

The steps 7.701 to 7.706 result in the delivery of the alarm message from the customer terminal to the CMS without the involvement of the communications management center common database 2.116.

In one option, when the central station gateway has sent the converted message to the automation system, it can than send a confirmation message to the customer terminal via the WAN2 2.024, router 2.122.4, and WAN1 2.136 at steps 7.707, 7.708, 7.709, 7.710. The central station gateway can generate the confirmation message including the address of the customer terminal 2.1.08.2.

In a further option, the CMS can send an acknowledgement signal to the central station gateway at step 7.712, and the central station gateway can send a notification message to the management terminal 2.124 via WAN2 at steps 7.713, 7.714.

Figure 8:
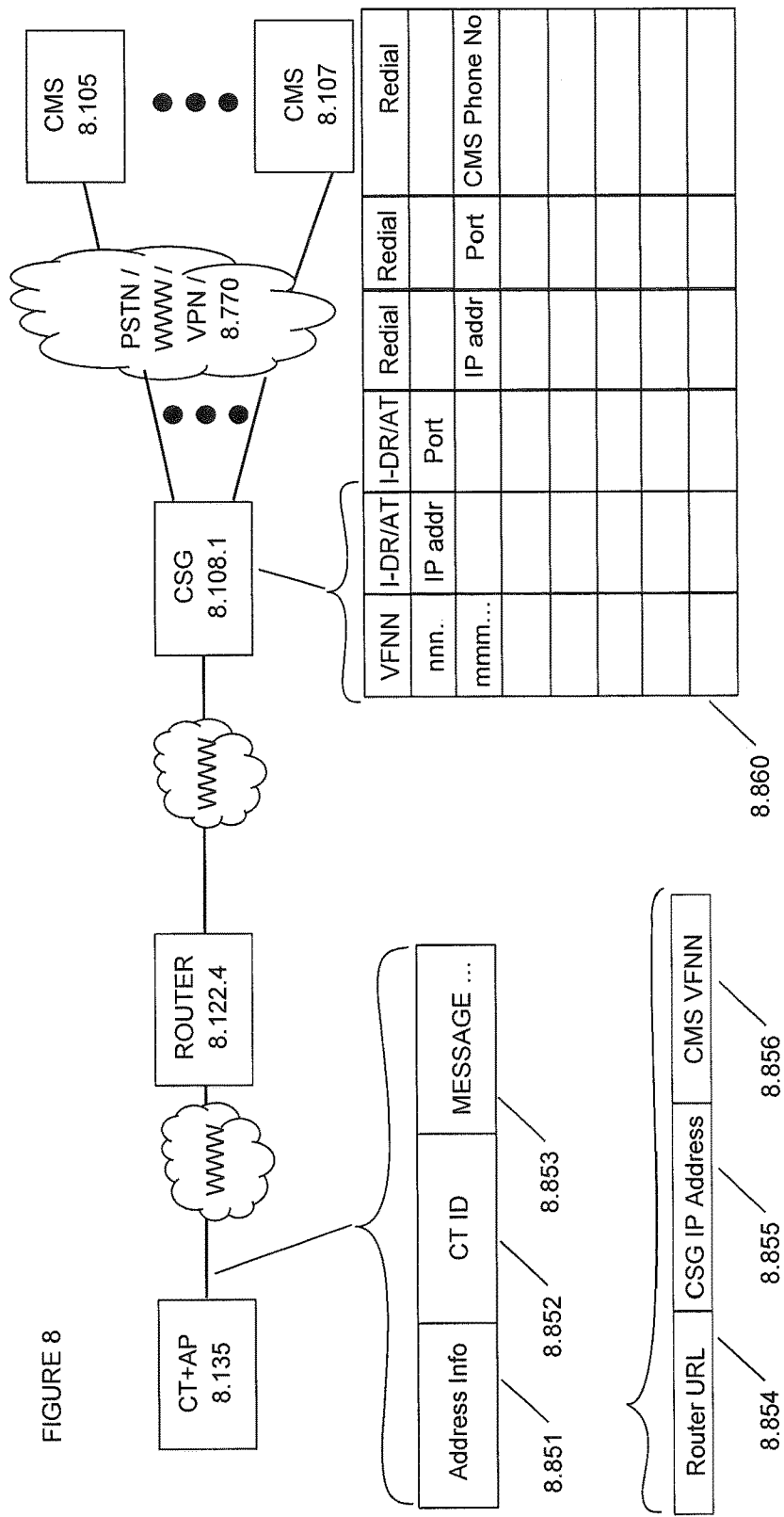
FIG. 8 represents the link between a customer terminal and an associated central monitoring station (CMS) in accordance with an embodiment of the invention.

FIG. 8 illustrates the communication process between a customer terminal 8.135 incorporating alarm panel functionality and a central monitoring station 8.105. The process will be described in the context of an alarm message, but it will be understood that a similar process is applicable to other communications between the customer terminal and the CMS.

When an alarm sensor connected to the customer terminal 8.135 activates, the terminal generates an alarm message. The message may include address information 8.851 for the CSG 8.108.1, and the CMS 8.105.

The address information for the CSG 8.108.1 may be the IP address 8.855 for the CSG.

The address information for the CMS 8.105 may be a virtual phone number 8.856 for the CMS.

The message may also include the customer terminal identification 8.852, a message 8.853, and contains contact information for the CMS 8.105. The contact information may be in the form of an IP address 8.854 of the CSG 8.108.1 associated with CMS 8.105.

The customer terminal (8.135) sends the message to the proprietary router (8.122.4) over the permanent IP tunnel. When the proprietary router receives the alarm message, it utilizes the IP address 8.855 of the CSG to forward the message to the CSG 8.108.1.

The CSG can be associated with more than one CMS. In the case where the CSG is associated with more than one CMS, the CSG needs to determine to which CMS the message is to be forwarded. To facilitate this, the customer terminal may include information identifying the CMS with which the customer terminal is associated, and the CSG needs to have a means for correlating the CMS identification information sent by the customer terminal.

In one embodiment of the invention, the customer terminal includes as the CMS identification information 8.856 may be a virtual phone number, such as a virtual full national number (VFNN), As shown in FIG. 4, and as discussed in AU2013902859, the CSG 4.108 can connect with the CMS 4.104 via several types of connection, depending on the capability of the CMS.

The GSG 8.108.1 may include a look-up table 8.860 which correlates each VFNN with an address for a specific CMS.

Where there is an IP link to the CMS, such as via the AT 4.402, the VFNN translation will be as shown in table 8.860 line "nnn . . . ". The VFNN will translate to the CSG port and IP address of AT 4.402. The AT 4.402 can be adapted to convert messages between IP format and the format required by the CMS 4.104.

Where the CMS is connected via a dialer receiver such as 4.127, the link to the CMS is via redialer 4.152. The VFNN "mmm . . . " will translate to the CSG port and IP address of the redialer 4.152 and will also include the phone number to be dialled through the PSTN 4.155 to connect to dialer receiver 4.127 and CMS 4.104.

Figures 10, 11:
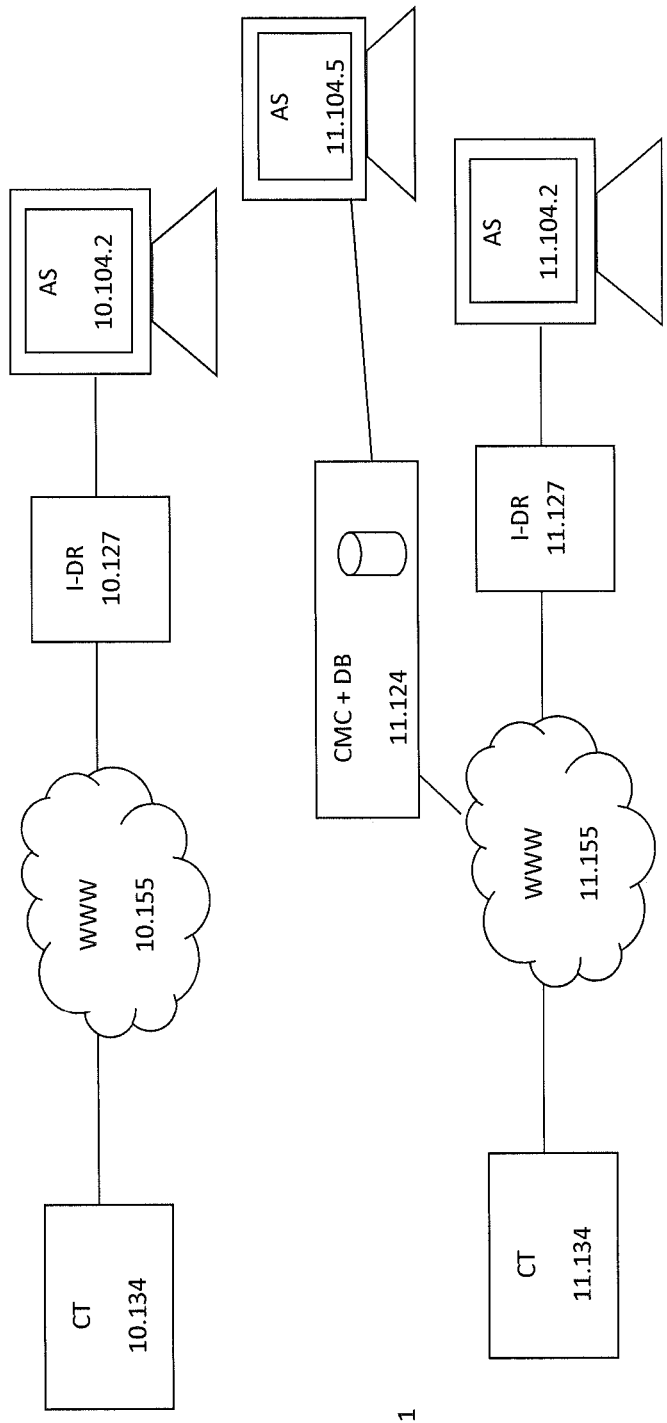
FIG. 10 shows a prior art alarm reporting system.
FIG. 11 shows a second prior art alarm reporting system.

FIG. 10 details the point-to-point network architecture often used to facilitate alarm system communications whereby the customer terminal (10.134) communicates with the IP-enabled dialer receiver (10.127) over an IP network such as the internet (www) 10.155. As noted above, this arrangement suffers from the limitation that fault location is difficult to achieve. While the arrangement in FIG. 11 overcomes the fault location difficulties associated with the arrangement shown in FIG. 10, it suffers from the unreliability introduced by the use of centralized servers and databases (11.124) as these introduce complexity and message delays.

Figure 12:
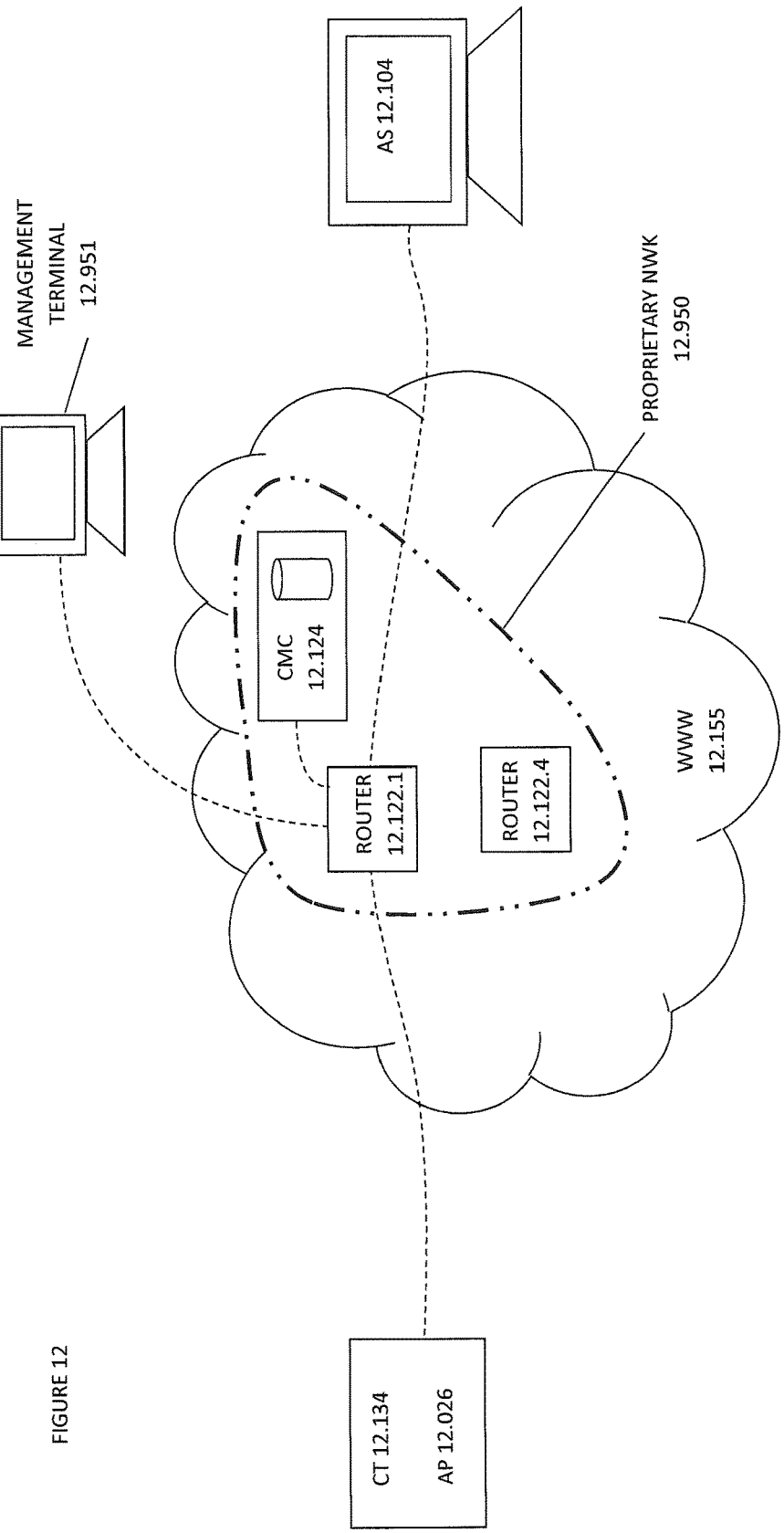
FIG. 12 shows a communication system according to an embodiment of the invention.

The arrangement of FIG. 12 delivers an improved combination of simplicity with ease of fault location. Customer terminal (12.134) communicates with automation system (12.104) via a proprietary router (12.122.1). The proprietary router (12.122.1) provides access to the communications path between the customer terminal (12.134) and the automation system (12.104) which supports fault location, remote configuration from the CMC (12.124) and other facilities as covered below.

Network availability may be enhanced by the arrangement shown in FIG. 12 comprising a cluster of proprietary routers (12.122.1, 12.122.2 etc.) which provide equipment redundancy while still retaining the inherent simplicity of the network and avoiding the unreliability and complexity associated with the use of centralized servers and databases for message switching.

Figure 9:
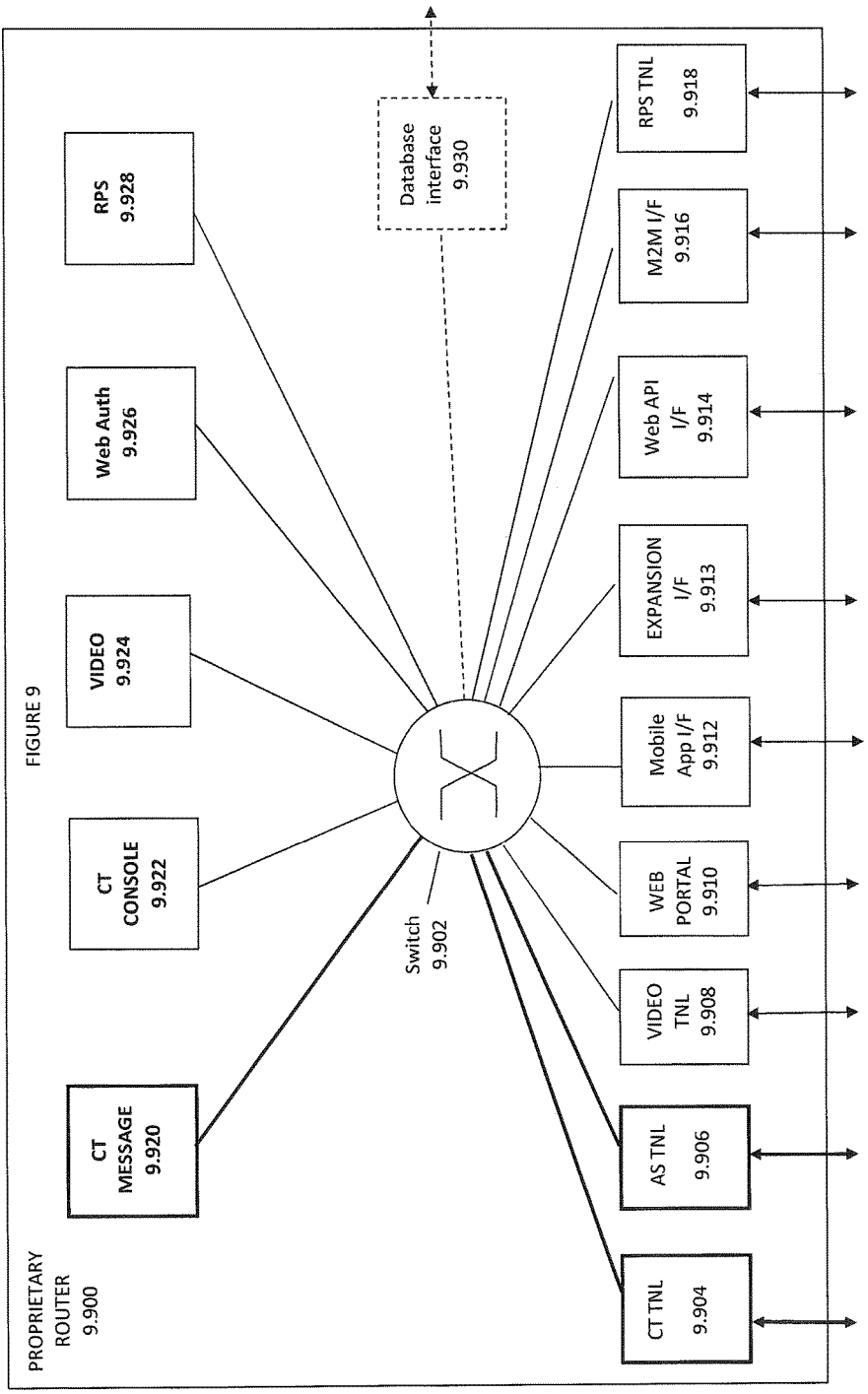
FIG. 9 is a functional block diagram of a router according to an embodiment of the invention.

FIG. 9 details one possible arrangement of the proprietary router (9.900). The proprietary router may comprise interfaces (9.904-9.918), applications (9.920 to 9.928), a message switch 9.902 and a database interface 9.930.

The interfaces are used to support the functionality desired by the customer terminal. The IP tunnel from the customer terminal connects to the customer terminal tunnel interface (9.904). The connection to the automation system is via automation system interface (9.906). Messages from the customer terminal enter the proprietary router via customer terminal interface (9.904), are routed by the switch (9.902) to the customer terminal message application (9.920) which inserts the message in to the automation system protocol which is routed by switch 9.902 to the automation system interface 9.906.

Additional functionality is supported such as remote access to the customer terminal console—whereby a remote user connecting via the web portal—using the web portal interface (9.910) or via a mobile app using the mobile app interface (9.912) is able to connect to the web server embedded in the customer terminal and to remotely configure and interrogate the customer terminal.

Video access from the customer terminals is supported via the proprietary router. The video stream from the customer terminal is delivered over an IP tunnel that terminates on the proprietary router's video tunnel interface (9.908). The resultant IP stream is switched via switch (9.902) to the video application (9.924) and routed to the customer terminal interface (9.904) by switch (9.902) which may be connected to the proprietary router via the web portal interface (9.910), the mobile app interface (9.912) or the web API (9.914).

Remote programming of the alarm panel connected to the customer terminal, or the customer terminal when it functions as an alarm panel, is supported via the RPS (remote programming software) interface (9.918) and associated application (9.928). A terminal such as (12.951) can be connected to the proprietary route 12.122.1 to enable programming of the proprietary router. The RPS application is used to terminate the data stream from the remote programming software at the application layer by simulating a Hayes™ compatible modem or by other means. The modified serial stream is routed by switch 9.902 to the customer terminal tunnel (9.904) to be sent to the appropriated customer terminal.

The web auth (9.926) application is used to generate the tokens to support remote access from the mobile app as described above. These are stored in the token register or the database via the database interface (9.930), which is also used to configure and initialize the customer terminal as described above.

The web application programming interface (API) (9.914), in conjunction with the CT console application (9.922), the CT message application (9.920) and the video application (9.924) provides an API that supports the provision of system interfaces customized to suit additional service providers and to support customized apps and connection to back-of-house service activation systems, image display applications and other alarm notification systems.

In this specification, reference to a document, disclosure, or other publication or use is not an admission that the document, disclosure, publication or use forms part of the common general knowledge of the skilled worker in the field of this invention at the priority date of this specification, unless otherwise stated.

In this specification, terms indicating orientation or direction, such as "up", "down", "vertical", "horizontal", "left", "right" "upright", "transverse" etc. are not intended to be absolute terms unless the context requires or indicates otherwise.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A proprietary router adapted to be incorporated in a WAN, the proprietary router including:
   at least a first message switch;
   at least a first interface;
   at least a second interface;
   and at least a first message processor;
   the first message processor being connectable to the first interface and the second interface via the message switch,
   the first message processor including a forwarding address extraction capability to extract a forwarding address from a message received on either the first or second interface, the first message processor inducing message forwarding capability to forward the message with the extracted address via the other of the first and second interfaces;
   a remote programming software (RPS) interface and RPS message processing means, at least one of the RPS message processing means being programmable via the RPS interface, at least one of the interfaces being programmable via the RPS interface.

2. A proprietary router as claimed in claim 1, including a third, a fourth, and a fifth interface interfaces and a second message processing means, the third interface including an image and/or audio data reception capability, the second message processing means including an image and/or audio data formatting capability for transmission via the fourth interface or the fifth interface.

3. A proprietary router as claimed in claim 1, including a sixth interface, wherein the first message processor including an alternative address extraction capability extracting an alternative address from a message received on the first interface and wherein the switch induces alternative addressing means to forward the message via the sixth interface.

4. A proprietary router as claimed in claim 1, including a fifth interface and a fourth interface and a third message processing means the third message processing means being adapted to provide access for a remote terminal from either the fourth or fifth interface via the first interface to a first terminal, to enable management, configuration and status control of the first terminal.

5. A proprietary router as claimed in claim 1, including a seventh interface and a fourth message processing means, the fourth message processing means is adapted to carry (encapsulated) bidirectional serial traffic between the seventh interface and the first interface via the message switch, the first terminal being adapted to regenerate the serial traffic from the encapsulated traffic to enable remote configuration of alarm systems adapted to communicate via the PSTN.

6. A proprietary router as claimed in claim 1, including an eighth interface and third message processing means, data received via the first interface being modified by the third message processing means for transmission via the eighth interface.

7. A central station gateway including a proprietary router as claimed in claim 1.

8. A communication system including one or more proprietary routers, the proprietary router including:
   at least a first message switch;
   at least a first interface;
   at least a second interface;
   and at least a first message processor;
   the first message processor being connectable to the first interface and the second interface via the message switch,
   the first message processor including a forwarding address extraction capability to extract a forwarding address from a message received on either the first or second interface, the first message processor including message forwarding capability to forward the message with the extracted address via the other of the first and second interfaces;
   a remote programming software (RPS) interface and RPS message processing means, at least one of the RPS message processing mean being programmable via the RPS interface, at least one of the interfaces being programmable via the RPS interface.

9. A communication system as claimed in claim 8, including at least a first proprietary router and a second proprietary router, wherein first proprietary router forwards the message via the second proprietary router, and wherein the second proprietary router is adapted to forward the message to the second terminal.

10. A communication system as claimed in claim 8, including a message format converter adapted to convert the format of the message from a first format to a second format compatible with the second terminal.

11. A communication system as claimed in claim 8, including a communications management center (CMC), wherein each proprietary router is adapted to interface with the CMC.

12. A communication system as claimed in claim 8, wherein the first terminal includes one or more of: an alarm system communicator adapted to be connected to an alarm system, an alarm system, home automation control gateway.

13. A communication system as claimed in claim 12, wherein the second terminal is an alarm automation system.

14. A security message communication system including a mobile device access arrangement including one or more customer terminals;
   one or more proprietary routers; an authentication server; a common database used to authenticate user ID information (UIDI); a token register; wherein,
   each proprietary router is adapted to generate temporary tokens for each associated CT and transmit the tokens to the token register for storage,
   wherein tie authentication server is adapted to receive an access request from a mobile device, the access request including user identification information (UIDI),
   the association of a UIDI with at least one associated CT being stored in the common database,
   the authentication server being adapted to forward the access request to the common database for validation, wherein,
   on validation of the access request, the token register returns a token to the authentication server, with an address for an associated proprietary router which is associated with the selected CT with which the UIDI is associated, the authentication server passes the token and the address of the associated proprietary router to mobile device to enable the mobile device to connect to the CT via the associated proprietary router.

15. A system as claimed in claim 14, wherein the UIDI is associated with two or more associated CTs, and wherein the common database sends a list of associated CTs to the authentication server which forwards the list to the mobile device and wherein the user selects one of the associated CTs in the list to obtain access to the selected CT.

16. A system as claimed in claim 14, wherein the proprietary router generates tokens associated with each CT associated with the router for storage in the token register.

17. A system as claimed in claim 14, wherein the token register is incorporated in the common database.

18. A method of configuring a customer terminal (CT) from a common database (CDB) via a communication network to enable the CT to access at least one operational proprietary router, the customer terminal initially including at least one stored address for at least one default proprietary router, the CDB including configuration information for the CT, wherein one or more proprietary routers are incorporated in the communication network, the configuration message including the address or addresses of one or more operational proprietary routers, the method including:
   at the CT, using the or one of the stored addresses for one of the default proprietary routers to send a configuration request to the CDB via the default proprietary router associated with the stored address, the configuration request including identification information for the CT (CTIDI),
   at the CDB, using the CTIDI to select configuration information for the CT, forming a configuration message,
   transmitting the configuration message to the CT via the default proprietary router,
   at the CT, using the configuration information to configure the CT, including storing the address of one or more of the operational proprietary routers for use by the CT to transmit messages.

19. A method of transmitting a message from a customer terminal (CT) through a communication network to an automation system (AS) with which the CT is associated, the communication network including at least a first operational proprietary router, the CT including one or more operational proprietary router addresses: the method including: at the CT, forming a message including CT identification information (CTIDI), and AS location information;
   using the first operational proprietary router address to send the message to the first operational proprietary router;
   at the operational proprietary router, using tie AS location information to send the message to the AS;
   wherein the communication network includes at least a first and a second operational proprietary router, the method including sending the message from the first operational proprietary router to the AS via a said second operational proprietary router, replacing the AS location information by the address of the second operational proprietary router, the second operational proprietary router using the AS access information to enable adaptation of the format of the message to a format used by the AS.

20. A method as claimed in claim 19, wherein the second operational proprietary router is included in a central station gateway (CSG).

21. A method of transmitting a message from a customer terminal (CT) through a communication network to an automation system (AS) with which the CT is associated, the communication network including at least a first operational proprietary router, the CT including one or more operational proprietary router addresses: the method including:
   at the CT, forming a message including CT identification information (CTIDI), and AS location information;
   using the first operational proprietary router address to send the message to the first operational proprietary router;
   at the operational proprietary router, using the AS location information to send the message to the AS;
   wherein forming a message includes incorporating AS access information in the message, and wherein the method further includes using the AS access information to enable the message to be received by the AS.

22. A method as claimed in claim 21, wherein the AS access information is in the form of a phone number.

* * * * *